(12) United States Patent
Peng et al.

(10) Patent No.: US 11,275,275 B2
(45) Date of Patent: Mar. 15, 2022

(54) PHOTOALIGNMENT METHOD AND PHOTOALIGNMENT DEVICE

(71) Applicant: CHENGDU CEC PANDA DISPLAY TECHNOLOGY CO., LTD., Chengdu (CN)

(72) Inventors: Lin Peng, Chengdu (CN); Guangsheng Li, Chengdu (CN); Ning Ye, Chengdu (CN); Mingxin Dai, Chengdu (CN); Makoto Kambe, Chengdu (CN)

(73) Assignee: CHENGDU CEC PANDA DISPLAY TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 16/756,945

(22) PCT Filed: Mar. 7, 2020

(86) PCT No.: PCT/CN2020/078316
§ 371 (c)(1),
(2) Date: Apr. 17, 2020

(87) PCT Pub. No.: WO2020/143845
PCT Pub. Date: Jul. 16, 2020

(65) Prior Publication Data
US 2021/0063826 A1    Mar. 4, 2021

(30) Foreign Application Priority Data

Jan. 8, 2019  (CN) .......................... 201910015782.9

(51) Int. Cl.
*G02F 1/1337* (2006.01)
*G02F 1/13* (2006.01)
*G02F 1/1335* (2006.01)

(52) U.S. Cl.
CPC ...... *G02F 1/133788* (2013.01); *G02F 1/1303* (2013.01); *G02F 1/133514* (2013.01);
(Continued)

(58) Field of Classification Search
CPC ............. G02F 1/133788; G02F 1/1303; G02F 1/133514; G02F 1/133516; G02F 1/133753; G02F 1/133757
(Continued)

(56) References Cited

U.S. PATENT DOCUMENTS 9,007,552 B2    4/2015   Hayano et al.
2018/0284544 A1*  10/2018  Shimoshikiryoh .......................
                                                    G02F 1/133788

FOREIGN PATENT DOCUMENTS

CN    101762909 A    6/2010
CN    102226860 A    10/2011
(Continued)

OTHER PUBLICATIONS

Chinese Patent Office, Search Report of CN201910015782.9, 2 pages.
(Continued)

*Primary Examiner* — Ruiyun Zhang
(74) *Attorney, Agent, or Firm* — MacMillan, Sobanski & Todd LLC

(57) ABSTRACT

Provided are a photoalignment method and a photoalignment device, including: adjusting direction of light ray emitted from light source so that first angle is formed between that and XOY plane, and second angle is formed between projection of that on XOY plane and Y-axis; adjusting angle of polarizing plate so that it is parallel to XOY plane, and its light transmission axis is parallel to projection of that on XOY plane; moving array substrate along negative direction of Y-axis to perform exposure
(Continued)

operation on array substrate; and moving color filter substrate, which rotated by 180 degrees, in negative direction of Y-axis to perform exposure operation on color filter substrate, wherein color filter substrate has exposure regions which are completely identical, in position and number, to those of array substrate, and each exposure region is exposed to light in identical direction to that of corresponding exposure region of array substrate.

9 Claims, 6 Drawing Sheets

(52) U.S. Cl.
CPC .. *G02F 1/133516* (2013.01); *G02F 1/133753* (2013.01); *G02F 1/133757* (2021.01)

(58) Field of Classification Search
USPC .......................... 427/553; 428/1.2; 349/123
See application file for complete search history.

(56) References Cited

FOREIGN PATENT DOCUMENTS

| | | |
|---|---|---|
| CN | 102395921 A | 3/2012 |
| CN | 102445788 A | 5/2012 |
| CN | 104238195 A | 12/2014 |
| CN | 104570489 A | 4/2015 |
| CN | 105044990 A | 11/2015 |
| CN | 105259710 A | 1/2016 |
| CN | 105372879 A | 3/2016 |
| CN | 106773337 A | 5/2017 |
| CN | 108027539 A | 5/2018 |
| CN | 109491148 A | 3/2019 |
| JP | 2013195792 A | 9/2013 |
| WO | 2011161921 A1 | 12/2011 |

OTHER PUBLICATIONS

PCT Search Report and Written Opinion, Application No. PCT/CN2020/078316, dated May 29, 2020.

* cited by examiner

PHOTOALIGNMENT METHOD AND PHOTOALIGNMENT DEVICE

CROSS-REFERENCE TO RELATED APPLICATIONS

Priority

This application is a U.S. national application of the international application number PCT/CN2020/078316 filed on Mar. 7, 2020, which claims priority of Chinese national application CN201910015782.9 filed on Jan. 8, 2019, the contents of all of which are incorporated herein by reference.

TECHNICAL FIELD

The present disclosure relates to the field of liquid crystal displays, and in particular to a photoalignment method and a photoalignment device.

BACKGROUND ART

Photoalignment in a liquid crystal display panel refers to control of the alignment of liquid crystal molecules by irradiation with ultraviolet light, which avoids contamination of a surface of a glass substrate or scratching of an alignment film that may be caused during alignment by rubbing, and in which multi-domain alignment can be achieved through a photomask. $UV^2A$ (Ultra Violet Vertical Alignment) technology is one of photoalignment technologies. Four-domain alignment can be easily achieved by the $UV^2A$ technology to enhance the viewing angle performance of the panel.

FIG. 1 is a top view of an operation scene in a photoalignment method known to the inventors of the present application, FIG. 2 is a front view of the operation scene in the photoalignment method, FIG. 3 is a perspective view of the operation scene in the photoalignment method, and FIG. 4 is a schematic view showing an exposure sequence and exposure directions in the photoalignment method. Referring to FIG. 1 to FIG. 4, a direction in which sub-pixels of different colors are arranged is defined as a row direction, and a direction perpendicular to the row direction is defined as a column direction. One sub-pixel in the figures has a length of a in the row direction and a length of b in the column direction. The alignment is performed by the following steps:

In a first step, half of the length of one sub-pixel in the row direction is set as the pitch (i.e., 0.5a) of a photomask on an array substrate side, and the sub-pixel is divided into a left region and a right region along the row direction for alignment in the column direction, wherein the left region and the right region have opposite alignment directions. In a second step, half of the length of one sub-pixel in the column direction is set as the pitch (i.e., 0.5b) of a photomask on a color filter substrate side, and the sub-pixel is divided into an upper region and a lower region along the column direction for alignment in the row direction, wherein the upper region and the lower region have opposite alignment directions. After the exposure is completed, a total of four domains are formed by the upper left, lower left, upper right, and lower right regions in one sub-pixel.

FIG. 5 is a schematic structural view of a pixel zone created by the photoalignment method known to the inventors of the present application, and FIG. 6 is a schematic structural view of alignment dark patterns of the pixel zones created by the photoalignment method. Referring to FIG. 5 and FIG. 6, in the prior art technology described above, "吕"-shaped or "卍"-shaped dark patterns, collectively referred to as alignment dark patterns, may occur in sub-pixels in a white state due to the dual effects of the ultraviolet photoalignment on both sides of the array substrate and the color filter substrate and the electric fields at the edges of pixel electrodes. The alignment dark patterns each comprise a cross-shaped main dark pattern located in the middle position of a pixel and edge dark patterns located at the edge positions of the pixel. The alignment dark patterns seriously affect the transmittance of the pixel regions.

SUMMARY

The present disclosure provides a photoalignment method and a photoalignment device. The photoalignment method and the photoalignment device can reduce the area (or size) of alignment dark patterns generated by the photoalignment, to improve the transmittance of the pixel regions. Embodiments of the present disclosure may be implemented, for example, in the following manner.

One aspect of the present disclosure provides a photoalignment method, which may comprise:

adjusting a direction of a light ray emitted from a light source so that a first angle is formed between the light ray emitted and an XOY plane, and a second angle is formed between a projection of the light ray emitted on the XOY plane and a Y-axis;

adjusting an angle of a polarizing plate so that the polarizing plate is parallel to the XOY plane, and a light transmission axis of the polarizing plate is parallel to the projection of the light ray emitted on the XOY plane;

moving an array substrate along a negative direction of the Y-axis to perform an exposure operation on the array substrate, wherein a region of the array substrate corresponding to one pixel may be provided with four exposure regions along the Y-axis, and the four exposure regions may include a first region, a second region, a third region, and a fourth region, wherein the first region and the second region may be exposed to light in opposite directions, the second region and the third region may be exposed to light in directions perpendicular to each other, and the fourth region and the third region may be exposed to light in opposite directions; and moving a color filter substrate, which has been rotated by 180 degrees, in the negative direction of the Y-axis to perform an exposure operation on the color filter substrate, wherein the color filter substrate may have exposure regions which are completely identical, in position and number, to those of the array substrate, and each exposure region of the color filter substrate, which has been rotated by 180 degrees, may be exposed to light in an identical direction to that of the corresponding exposure region of the array substrate.

Optionally, after the color filter substrate, which has been rotated by 180 degrees, is subjected to the exposure operation, the color filter substrate is rotated by 180 degrees again so that the exposure direction in each exposure region of the color filter substrate is opposite to the exposure direction in the corresponding exposure region of the array substrate.

Optionally, each of the exposure regions may be correspondingly provided with one light source and the polarizing plate matched with the light source;

optionally, the light rays emitted from the light sources corresponding to the first region and the second region may be projected on the XOY plane in opposite directions, the light rays emitted from the light sources corresponding to the second region and the third region may be projected on the XOY plane in directions perpendicular to each other, and the light rays emitted from the light sources corresponding to the fourth region and the third region may be projected on the XOY plane in opposite directions.

Optionally, each of the numbers of the light sources and the polarizing plates may be four, the first angle may be formed between the light ray emitted from each of the four light sources and the XOY plane, and the light rays emitted from the four light sources may be projected on the XOY plane in different directions to achieve different exposure directions in the four exposure regions.

Optionally, each of the exposure regions may be correspondingly provided with one mask, the mask may comprise a light-transmitting zone and a light-shielding zone, and the light-transmitting zone may correspond to the position of a region where an exposure operation is to be performed.

Optionally, four masks may be provided, corresponding to four exposures, respectively, and, in the exposure of the first region, a position of the used mask corresponding to the first region may be the light-transmitting zone and positions of the used mask corresponding to the second region, the third region, and the fourth region may be the light-shielding zones.

Optionally, the mask may be disposed between the polarizing plate and the array substrate.

Optionally, the second angle may range from 30° to 60°.

Optionally, the first angle may range from 30° to 50°.

In the photoalignment method according to the present disclosure, the shape of alignment dark patterns in pixel regions are changed by changing the directions of the light rays emitted and the polarizing plates and changing the exposure regions and exposure directions in the substrates, whereby the area (or size) of the alignment dark patterns generated by the photoalignment is greatly reduced and the transmittance of the liquid crystal display panel can be effectively improved.

Another aspect of the present disclosure provides a photoalignment device, which may comprise: a controller, a light source, a polarizing plate, and a moving mechanism, wherein the moving mechanism may be configured to carry one of an array substrate and a color filter substrate and drive a movement of one of the array substrate and the color filter substrate;

the light source may be disposed above the moving mechanism, and the polarizing plate may be disposed between the moving mechanism and the light source;

the controller may be configured to:

adjust a direction of a light ray emitted from the light source so that a first angle can be formed between the light ray emitted and an XOY plane, and a second angle can be formed between a projection of the light ray emitted on the XOY plane and a Y-axis; and adjust an angle of the polarizing plate so that the polarizing plate can be parallel to the XOY plane, and a light transmission axis of the polarizing plate can be parallel to the projection of the light ray emitted on the XOY plane; and control the array substrate to move along a negative direction of the Y-axis to perform an exposure operation on the array substrate, wherein a region of the array substrate corresponding to one pixel may be provided with four exposure regions along the Y-axis, and the four exposure regions may include a first region, a second region, a third region, and a fourth region, wherein the first region and the second region may be exposed to light in opposite directions, the second region and the third region may be exposed to light in directions perpendicular to each other, and the fourth region and the third region may be exposed to light in opposite directions; and control the color filter substrate, which has been rotated by 180 degrees, to move in the negative direction of the Y-axis to perform an exposure operation on the color filter substrate, wherein the color filter substrate may have exposure regions which are completely identical, in position and number, to those of the array substrate, and each exposure region of the color filter substrate, which has been rotated by 180 degrees, may be exposed to light in an identical direction to that of the corresponding exposure region of the array substrate.

Optionally, after the color filter substrate, which has been rotated by 180 degrees, is subjected to the exposure operation, the color filter substrate is rotated by 180 degrees again so that the exposure direction in each exposure region of the resultant color filter substrate is opposite to the exposure direction in the corresponding exposure region of the array substrate.

Optionally, each of the exposure regions may be correspondingly provided with one light source and the polarizing plate matched with the light source;

optionally, the light rays emitted from the light sources corresponding to the first region and the second region may be projected on the XOY plane in opposite directions, the light rays emitted from the light sources corresponding to the second region and the third region may be projected on the XOY plane in directions perpendicular to each other, and the light rays emitted from the light sources corresponding to the fourth region and the third region may be projected on the XOY plane in opposite directions.

Optionally, each of the exposure regions may be correspondingly provided with one mask, the mask may comprise a light-transmitting zone and a light-shielding zone, and the light-transmitting zone may correspond to the position of a region where an exposure is to be performed.

Optionally, four masks may be provided, corresponding to four exposures, respectively, and, in the exposure of the first region, a position of the used mask corresponding to the first region may be the light-transmitting zone and positions of the used mask corresponding to the second region, the third region, and the fourth region may be the light-shielding zones.

Optionally, the mask may be disposed between the polarizing plate and the array substrate.

Optionally, the second angle may range from 30° to 60°.

Optionally, the first angle may range from 30° to 50°.

The photoalignment device according to the present disclosure changes the shape of alignment dark patterns in pixel regions by changing the directions of the light rays emitted and the polarizing plates and changing the exposure regions and exposure directions in the substrates, whereby the area (or size) of the alignment dark patterns generated by the photoalignment is greatly reduced and the transmittance of the liquid crystal display panel can be effectively improved.

BRIEF DESCRIPTION OF DRAWINGS

In order to more clearly illustrate technical solutions of the present disclosure or the prior art, drawings required for use in the description of the embodiments or the prior art will be described briefly below. It is obvious that the drawings in the following description are illustrative of some embodiments of the present disclosure. It will be understood by those of ordinary skill in the art that other drawings can also be obtained from these drawings without any inventive effort.

REFERENCE NUMERALS

Figure 1:
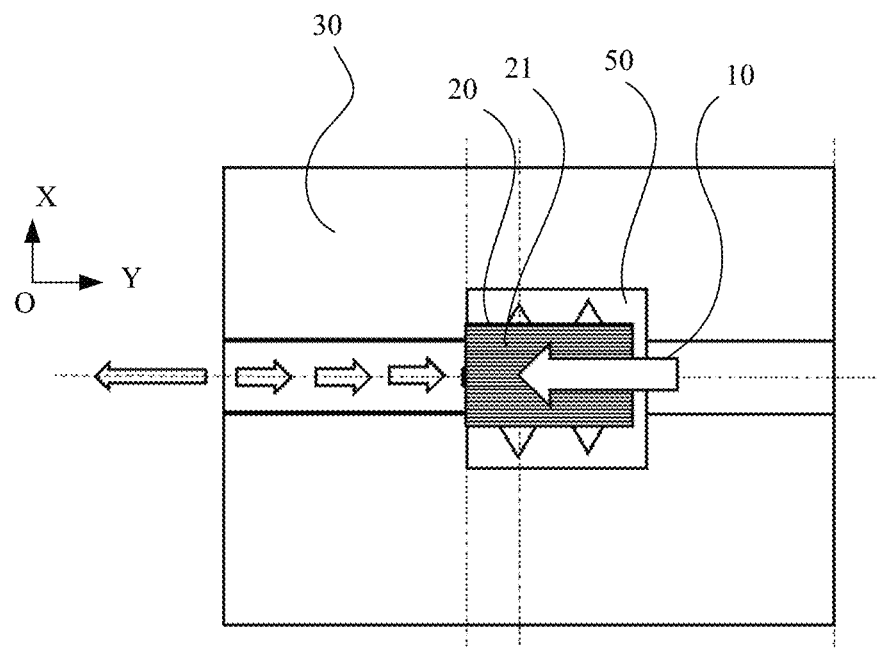
FIG. 1 is a top view of an operation scene in a photoalignment method known to the inventors of the present application.
Figure 2:
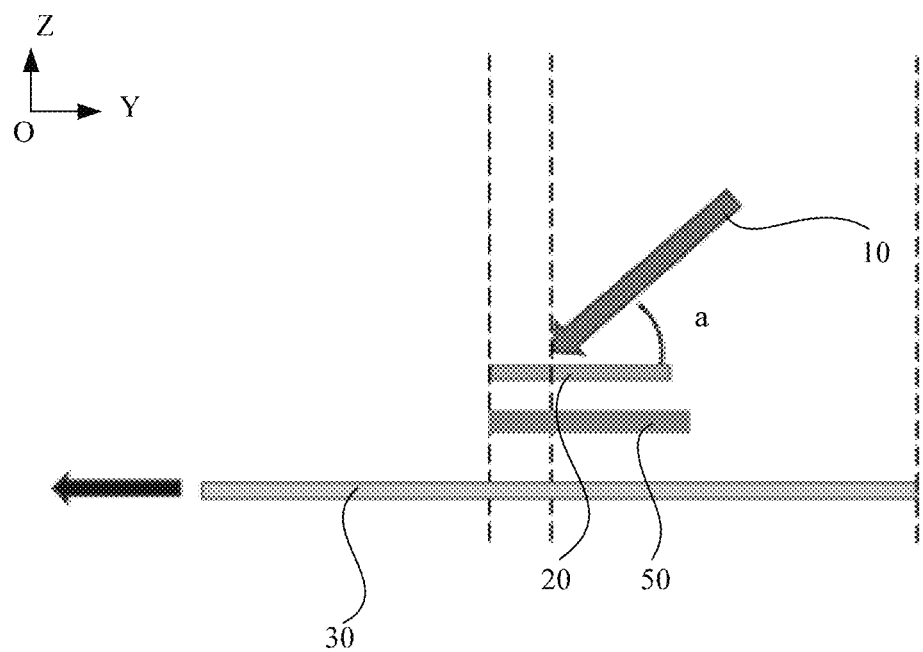
FIG. 2 is a front view of the operation scene in the photoalignment method known to the inventors of the present application.
Figure 3:
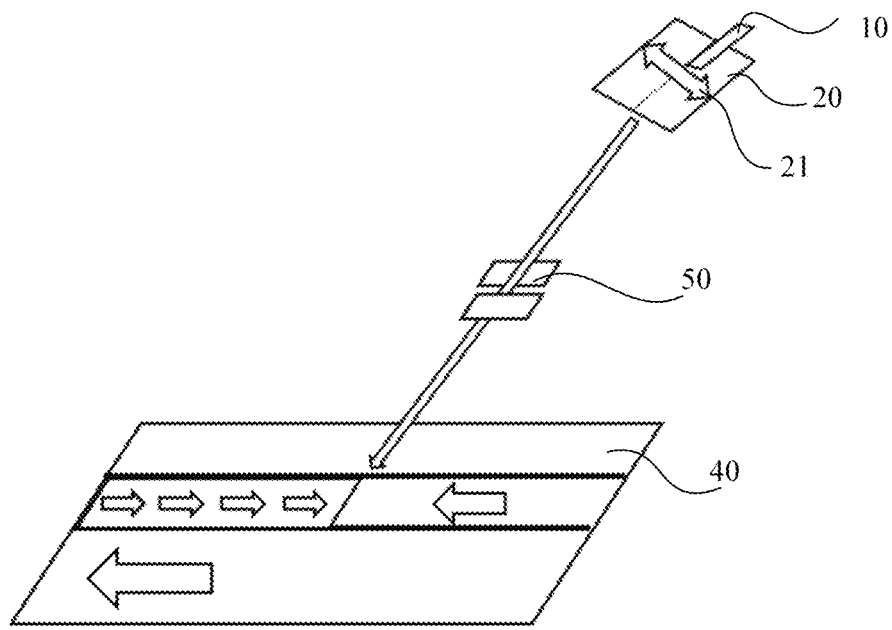
FIG. 3 is a perspective view of the operation scene in the photoalignment method known to the inventors of the present application.
Figure 4:
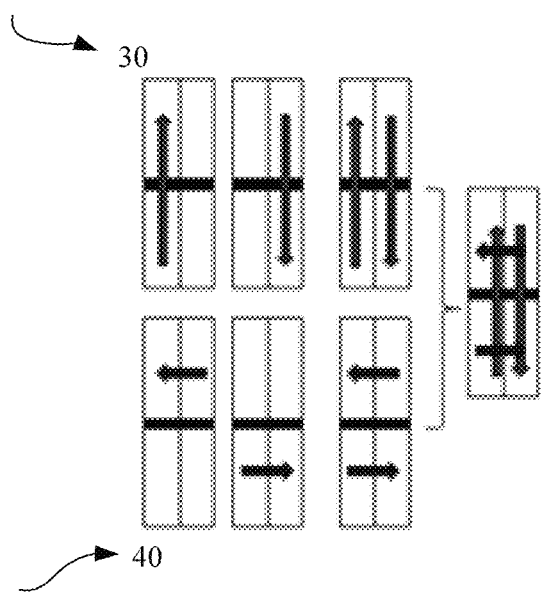
FIG. 4 is a schematic view showing an exposure sequence and exposure directions in the photoalignment method known to the inventors of the present application.

10—light ray emitted
20—polarizing plate
21—light transmission axis
30—array substrate
31—first region
32—second region
33—third region
34—fourth region
40—color filter substrate
50—mask
a—first angle
b—second angle

DETAILED DESCRIPTION OF EMBODIMENTS

In order to further clarify the objects, technical solutions, and advantages of the present disclosure, the technical solutions of the present disclosure will be described below clearly and completely with reference to the drawings of the present disclosure. It is apparent that the embodiments to be described are some, but not all of the embodiments of the present disclosure. All the other embodiments obtained by those of ordinary skill in the art in light of the embodiments of the present disclosure without inventive efforts will fall within the scope of the present disclosure as claimed.

It should be noted that the Vertical Alignment (referred simply to as VA) technology for a liquid crystal display panel is based on the following principle: liquid crystal molecules are aligned substantially perpendicular to the surface of the panel in a state where no electric field is applied, and the liquid crystal molecules are tilted and in a changed state when an electric field is applied; in order to control the direction in which the liquid crystal molecules will be tilted when an electric field is applied, protrusions and slits may be designed on the liquid crystal panel, and their shapes may be changed to achieve a slightly inclined state and a stable state of the liquid crystal molecules. When an electric field is applied, the liquid crystal molecules near the protrusions and the slits first begin to be tilted, and then other liquid crystal molecules are pushed down according to the domino effect.

The alignment direction is generally controlled by using alignment by rubbing or photoalignment. The alignment by rubbing may cause the problems of static electricity and particle contamination. Moreover, the alignment by rubbing allows an alignment only in one horizontal direction, and thus is not suitable for multi-domain vertical alignment (referred simply to as MVA) required for widening of a viewing angle. The photoalignment is a non-contact alignment technology in which an inclination angle is formed by irradiating a light-sensitive polymer alignment film with linearly polarized light. The UV$^2$A (Ultra Violet Vertical Alignment) technology is a vertical alignment (referred simply to as VA) technology in which liquid crystals are aligned by using ultraviolet (referred simply to as UV) light. Use of the UV$^2$A photoalignment technology in a vertical alignment display mode allows a precise alignment of liquid crystal molecules, and the viewing angle characteristic of the vertical alignment display can be greatly improved by applying different alignment directions to different regions of a pixel by a change in exposure direction.

Multiple domains generally include two domains, four domains, and eight domains. With a larger number of domains, a better viewing angle characteristic is obtained, but the transmittance is decreased accordingly. This is because although liquid crystal molecules at a boundary between respective adjacent domains are in a horizontal state while being driven by a voltage, the liquid crystal molecules in adjacent domains are not rotated in the same direction. As a result, an intermediate state (usually at 0° or 90°) between the rotation directions in two domains is generated at the boundary. Further, under the condition where a vertical alignment display mode is combined with a linear polarizing plate (or polarizer), the liquid crystal molecules in the horizontal state have the highest transmittance when rotated by an angle of 45° or 135°, and have the lowest transmittance when rotated by an angle of 0° or 90° (i.e., in a state where they are horizontal or perpendicular to a direction of polarization of light from the polarizing plate), therefore the transmittance is very low at the boundary between adjacent domains, and alignment dark patterns are formed.

Here, in the four-domain vertical alignment technology, a pixel zone is divided into four domains with different alignments, thus dark patterns formed inside the pixel zones generally have a "斗" shape or "井" shape, and are collectively referred to as alignment dark patterns. The alignment dark patterns may reduce the transmittance of the liquid crystal display panel. The present disclosure will be described below with reference to the drawings in connection with specific embodiments.

Figure 7:
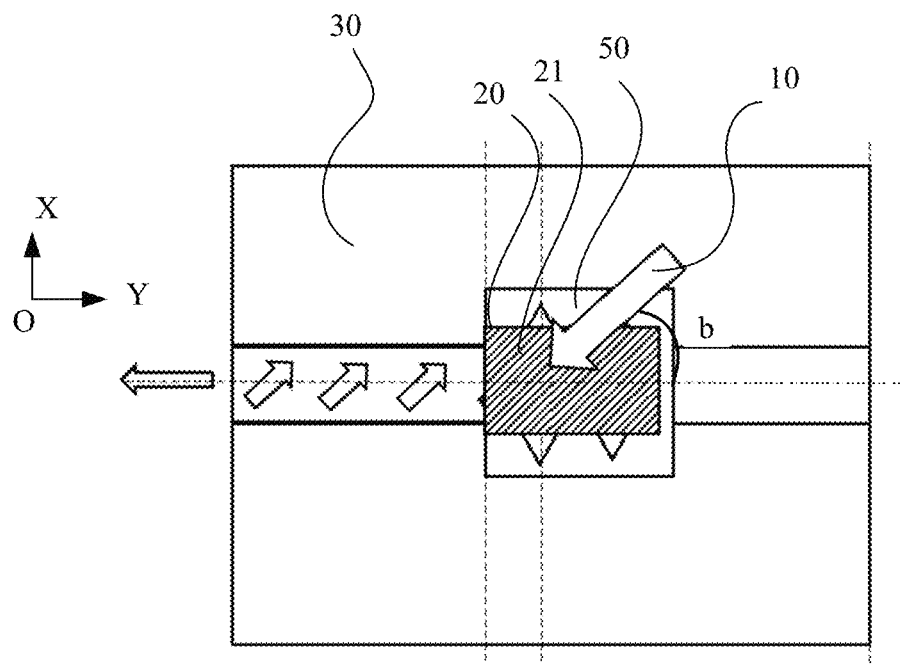
FIG. 7 is a top view of an operation scene in a photoalignment method according to an embodiment of the present disclosure.
Figure 8:
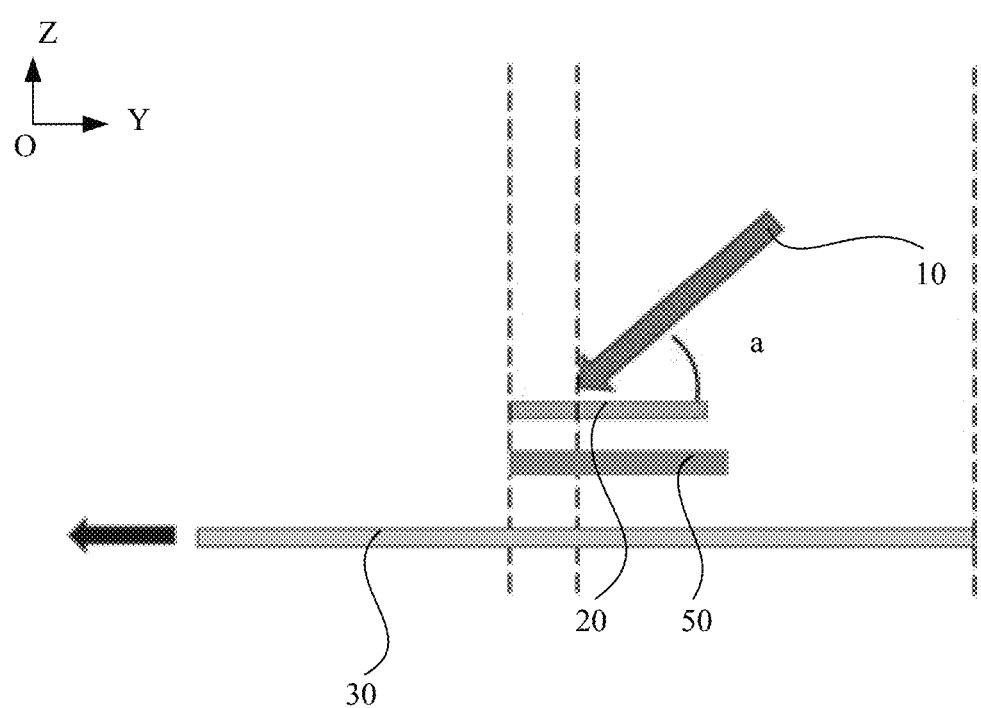
FIG. 8 is a front view of the operation scene in the photoalignment method according to the embodiment of the present disclosure.
Figure 9:
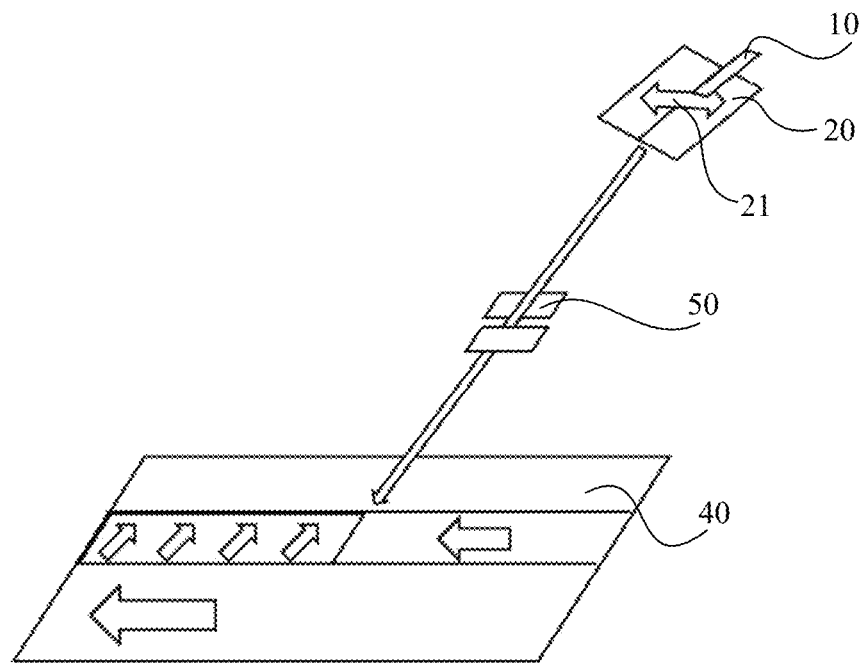
FIG. 9 is a perspective view of the operation scene in the photoalignment method according to the embodiment of the present disclosure.
Figure 10:
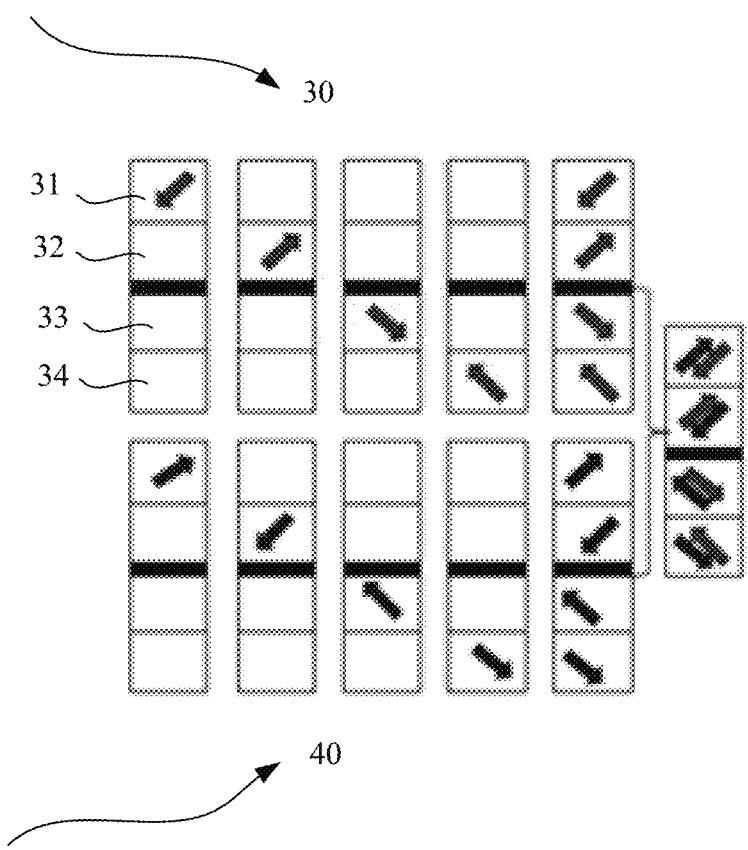
FIG. 10 is a schematic view showing an exposure sequence and exposure directions in the photoalignment method according to the embodiment of the present disclosure.

FIG. 7 is a top view of an operation scene in a photoalignment method according to an embodiment of the present disclosure, FIG. 8 is a front view of the operation scene in the photoalignment method according to the embodiment of the present disclosure, FIG. 9 is a perspective view of the operation scene in the photoalignment method according to the embodiment of the present disclosure, and FIG. 10 is a schematic view showing an exposure sequence and exposure directions in the photoalignment method according to the embodiment of the present disclosure. Referring to FIG. 7 to FIG. 10, an embodiment of the present disclosure may provide a photoalignment method. The method may comprise:

S101: adjusting a direction of a light ray emitted 10 from a light source so that a first angle a is formed between the light ray emitted 10 and an XOY plane, and a second angle b is formed between a projection of the light ray emitted 10 on the XOY plane and a Y-axis;

S102: adjusting an angle of a polarizing plate 20 so that the polarizing plate 20 is parallel to the XOY plane, and a light transmission axis 21 of the polarizing plate 20 is parallel to the projection of the light ray emitted 10 on the XOY plane;

S103: moving an array substrate 30 along a negative direction of the Y-axis to perform an exposure operation on the array substrate 30, wherein a region of the array substrate 30 corresponding to one pixel may be provided with four exposure regions (i.e., regions to be exposed to light) along the Y-axis, and the four exposure regions may include a first region 31, a second region 32, a third region 33, and a fourth region 34, wherein the first region 31 and the second region 32 may be exposed to light in opposite directions, the second region 32 and the third region 33 may be exposed to light in directions perpendicular to each other, and the fourth region 34 and the third region 33 may be exposed to light in opposite directions; and S104: moving a color filter substrate 40, which has been rotated by 180 degrees, in the negative direction of the Y-axis to perform an exposure operation on the color filter substrate 40, wherein the color filter substrate 40 may have exposure regions which are completely identical, in position and number, to those of the array substrate 30, and each exposure region of the color filter substrate 40, which has been rotated by 180 degrees, may be exposed to light in an identical direction to that of the corresponding exposure region of the array substrate 30.

Optionally, a plane in which the array substrate 30 or the color filter substrate 40 is located may be defined as the XOY plane. In the XOY plane, the X-axis may be perpendicular to the Y-axis, and the Z-axis may be in a direction perpendicular to the XOY plane. By adjusting the direction of the light ray emitted 10 from the light source and the angle of the polarizing plate 20, a light ray which is a light ray at a certain angle can be irradiated onto an exposure region of the array substrate 30, so that a certain angle can be formed between the direction of exposure of the exposure region and a column direction of the pixel zone of the substrate, as shown in FIG. 10.

Optionally, during the exposure of the array substrate 30, a region of the array substrate 30 corresponding to one pixel may be divided evenly into four exposure regions in the length direction of the pixel zone, that is, along the Y-axis. Optionally, the exposure directions in the four exposure regions may be different from one another. Specifically, the first region 31 and the second region 32 may be exposed to light in opposite directions, the second region 32 and the third region 33 may be exposed to light in directions perpendicular to each other, and the fourth region 34 and the third region 33 may be exposed to light in opposite directions.

Optionally, during the exposure of the color filter substrate 40, correspondingly, a region of the color filter substrate 40 corresponding to one pixel may be divided evenly into four exposure regions in the length direction of the pixel zone, that is, along the Y-axis. Optionally, the exposure directions in the four exposure regions may be different from one another. Specifically, the first region 31 and the second region 32 may be exposed to light in opposite directions, the second region 32 and the third region 33 may be exposed to light in directions perpendicular to each other, and the fourth region 34 and the third region 33 may be exposed to light in opposite directions. Referring to FIG. 10, the direction of an arrow in the figure represents an exposure direction. The exposure direction in each exposure region of the color filter substrate 40 may be opposite to the exposure direction in the corresponding exposure region of the array substrate 30. This can be achieved in the actual operation as long as the color filter substrate 40 is rotated by 180 degrees and then subjected to an exposure operation according to the process of exposure of the array substrate 30, and the color filter substrate 40 is rotated by 180 degrees again after the color filter substrate 40, which has been rotated by 180 degrees, is subjected to the exposure operation.

Figure 5:
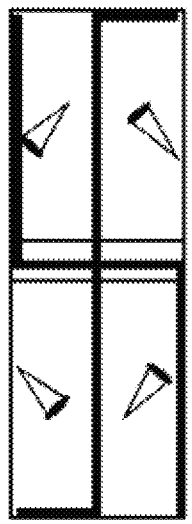
FIG. 5 is a schematic structural view of a pixel zone created by the photoalignment method known to the inventors of the present application.
Figure 6:
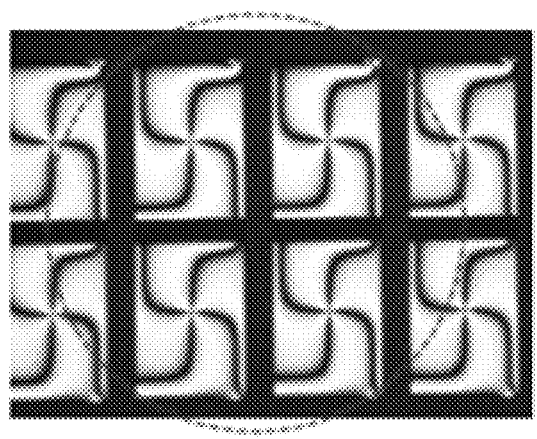
FIG. 6 is a schematic structural view of alignment dark patterns of the pixel zones created by the photoalignment method known to the inventors of the present application.
Figure 11:
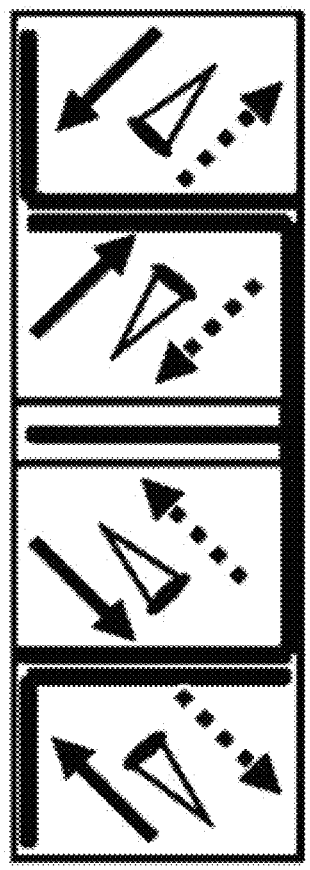
FIG. 11 is a schematic structural view of a pixel zone created by the photoalignment method according to the embodiment of the present disclosure.
Figure 12:
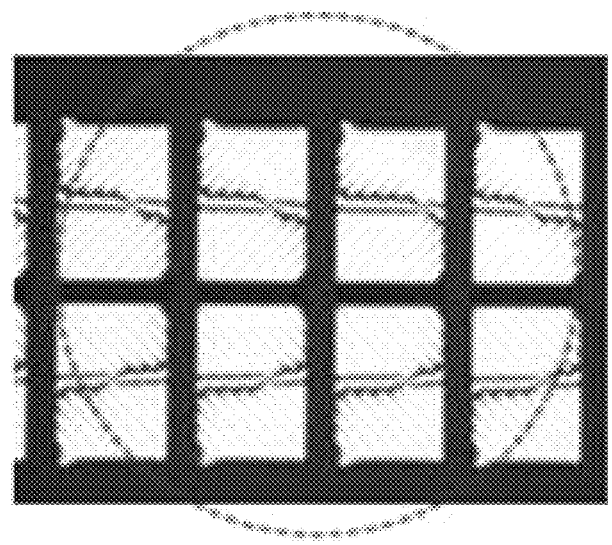
FIG. 12 is a schematic structural view of alignment dark patterns of the pixel zones created by the photoalignment method according to the embodiment of the present disclosure.

FIG. 11 is a schematic structural view of a pixel zone created by the photoalignment method according to the embodiment of the present disclosure, and FIG. 12 is a schematic structural view of alignment dark patterns of the pixel zones created by the photoalignment method according to the embodiment of the present disclosure. Referring to FIG. 11, optionally, after the array substrate 30 and the color filter substrate 40 fabricated according to the photoalignment method described above are disposed corresponding to each other and filled with liquid crystal molecules, the liquid crystal molecules may be tilted in different directions in four regions of a pixel zone. The formed alignment dark patterns are as shown in FIG. 12. Compared with the alignment dark patterns shown in FIG. 5 and FIG. 6 in the prior art, in this embodiment, the area (or size) of the alignment dark patterns can be greatly reduced, and therefore the transmittance of the pixels can be effectively improved.

Optionally, each of the exposure regions may be correspondingly provided with a light source and a polarizing plate 20 matched with the light source; and optionally, the light rays emitted 10 from the light sources corresponding to the first region 31 and the second region 32 may be projected on the XOY plane in opposite directions, the light rays emitted 10 from the light sources corresponding to the second region 32 and the third region 33 may be projected on the XOY plane in directions perpendicular to each other, and the light rays emitted 10 from the light sources corresponding to the fourth region 34 and the third region 33 may be projected on the XOY plane in opposite directions.

Optionally, each of the numbers of the light sources and the polarizing plates 20 may be four, and a first angle a may be formed between the light ray emitted 10 from each of the four light sources and the XOY plane, but the light rays emitted 10 from the four light sources may be projected on the XOY plane in different directions to achieve different exposure directions in the four exposure regions. Optionally, the polarizing plate 20 may always be kept parallel to the XOY plane, and the direction of the light transmission axis 21 on the polarizing plate 20 may always be the same as the direction of projection of the light ray emitted 10 from the light source on the XOY plane.

Optionally, each of the exposure regions may be correspondingly provided with a mask 50, the mask 50 may comprise a light-transmitting zone and a light-shielding zone, and the light-transmitting zone may correspond to the position of a region where an exposure operation is to be performed. Optionally, four masks 50 may be provided, corresponding to four exposures, respectively. Optionally, in the exposure of the first region 31, a position of the used mask 50 corresponding to the first region 31 may be the light-transmitting zone, and positions of the used mask corresponding to the second region 32, the third region 33, and the fourth region 34 may be the light-shielding zones; optionally, in the exposure of the second region 32, the position of the used mask 50 corresponding to the second region 32 may be the light-transmitting zone, and positions of the used mask corresponding to the first region 31, the third region 33, and the fourth region 34 may be the light-shielding zones; optionally, in the exposure of the third region 33, the position of the used mask 50 corresponding to the third region 33 may be the light-transmitting zone, and positions of the used mask corresponding to the first region 31, the second region 32, and the fourth region 34 may be the light-shielding zones; and optionally, in the exposure of the fourth region 34, the position of the used mask 50 corresponding to the fourth region 34 may be the light-transmitting zone, and the positions of the used mask corresponding to the first region 31, the second region 32, and the third region 33 may be the light-shielding zones. Referring to FIG. 8, optionally, the mask 50 may be disposed between the polarizing plate 20 and the array substrate 30.

Optionally, the second angle b may be in a range of 0 to 90° (excluding 0 and 90°), and may be generally selected from a range of 30° to 60°. Preferably, the second angle b may be 45°. When the second angle b is 45°, a liquid crystal display panel fabricated by using the photoalignment method according to this embodiment can have an optimal viewing angle.

Optionally, the first angle a may range from 30° to 50°, and preferably, the first angle a may be 40°. Optionally, the first angle a may represent an angle formed between the light ray emitted from the light source and the plane in which the substrate is located. When the first angle a is set to 40°, a better exposure effect can be obtained.

In the photoalignment method according to the embodiment of the present disclosure, the shape of alignment dark patterns in pixel zones are changed by changing the directions of the light rays emitted and the polarizing plates and changing the exposure regions and exposure directions in the substrates, whereby the area (or size) of the alignment dark patterns is greatly reduced and the transmittance of the liquid crystal display panel can be effectively improved.

With continued reference to FIG. 7 to FIG. 10, an embodiment of the present disclosure may further provide a photoalignment device. The photoalignment device may comprise a controller, light sources, polarizing plates 20, and a moving mechanism. Optionally, the moving mechanism may be configured to carry one of an array substrate 30 and a color filter substrate 40 and drive a movement of one of the array substrate 30 and the color filter substrate 40. Optionally, the light source may be disposed above the moving mechanism, and the polarizing plate 20 may be disposed between the moving mechanism and the light source. Optionally, the controller may be configured to: adjust a direction of a light ray emitted 10 from the light source so that a first angle a is formed between the light ray emitted 10 and an XOY plane, and a second angle b is formed between a projection of the light ray emitted 10 on the XOY plane and a Y-axis; and adjust an angle of the polarizing plate 20 so that the polarizing plate 20 is parallel to the XOY plane, and a light transmission axis 21 of the polarizing plate 20 is parallel to the projection of the light ray emitted 10 on the XOY plane; and control the array substrate 30 to move along a negative direction of the Y-axis to perform an exposure operation on the array substrate 30. Optionally, a region of the array substrate 30 corresponding to one pixel may be provided with four exposure regions along the Y-axis, and the four exposure regions may include a first region 31, a second region 32, a third region 33, and a fourth region 34. Optionally, the first region 31 and the second region 32 may be exposed to light in opposite directions, the second region 32 and the third region 33 may be exposed to light in directions perpendicular to each other, and the fourth region 34 and the third region 33 may be exposed to light in opposite directions. Optionally, the controller may be further configured to control the color filter substrate 40 which has been rotated by 180 degrees to move in the negative direction of the Y-axis to perform an exposure operation on the color filter substrate 40. Optionally, the color filter substrate 40 may have exposure regions which are completely identical, in position and number, to those of the array substrate 30, and the respective exposure regions of the color filter substrate may be exposed to light in identical directions to those of the array substrate 30 before being rotated by 180 degrees again.

Specifically, the controller may adjust the direction of the light ray emitted 10 from the light source so that a first angle a is formed between the light ray emitted 10 and the XOY plane, and a second angle b can be formed between the projection of the light ray emitted 10 on the XOY plane and the Y-axis. Optionally, the controller may also adjust a deflection angle of the polarizing plate 20 so that the polarizing plate 20 is parallel to the XOY plane, and the light transmission axis 21 of the polarizing plate 20 is parallel to the projection of the light ray emitted 10 on the XOY plane. Optionally, the controller may also control the moving mechanism to drive the array substrate 30 and the color filter substrate 40 rotated by 180° to move in the negative direction of the Y-axis, so as to achieve the exposure operations on the array substrate 30 and the color filter substrate 40.

Optionally, each of the exposure regions may be correspondingly provided with a light source and a polarizing plate 20 matched with the light source. Optionally, the light rays emitted 10 from the light sources corresponding to the first region 31 and the second region 32 may be projected on the XOY plane in opposite directions, the light rays emitted 10 from the light sources corresponding to the second region 32 and the third region 33 may be projected on the XOY plane in directions perpendicular to each other, and the light rays emitted 10 from the light sources corresponding to the fourth region 34 and the third region 33 may be projected on the XOY plane in opposite directions.

Optionally, each of the exposure regions may be correspondingly provided with a mask 50, the mask 50 may comprise light-transmitting zones and light-shielding zones, and the light-transmitting zone may correspond to the position of a region where an exposure operation is to be performed.

Optionally, the second angle b may be in a range of 0 to 90° (excluding 0 and 90°), and may be generally selected from a range of 30° to 60°. Preferably, the second angle b may be 45°. When the second angle b is 45°, a liquid crystal display panel fabricated by using the photoalignment device according to this embodiment can have an optimal viewing angle.

Optionally, the first angle a may range from 30° to 50°, and preferably, the first angle a may be 40°. Optionally, the first angle a may represent an angle formed between the light ray emitted from the light source and the plane in which the substrate is located. When the first angle a is set to 40°, a better exposure effect can be obtained.

The photoalignment device according to the embodiment of the present disclosure changes the shape of alignment dark patterns in pixel zones by changing the directions of the light rays emitted and the polarizing plates and changing the exposure regions and exposure directions in the substrates, whereby the area (or size) of the alignment dark patterns is greatly reduced and the transmittance of the liquid crystal display panel can be effectively improved.

In the description of the present disclosure, it should be understood that orientation or positional relationships indicated by the terms used herein such as "center", "length", "width", "thickness", "top end", "bottom end", "up", "down", "left", "right", "front", "rear", "vertical", "horizontal", "inside", "outside", "axial direction", and "circumferential direction" are the orientation or positional relationships shown based on the drawings, and these terms are intended only to facilitate the description of the present disclosure and simplify the description, but not intended to indicate or imply that the referred devices or elements must be in a particular orientation, or constructed or operated in the particular orientation, and therefore should not be construed as limiting the present disclosure.

In addition, the terms "first" and "second" are used for descriptive purposes only, and should not be understood as an indication or implication of relative importance or an implicit indication of the number of the indicated technical features. Therefore, a feature defined with the terms "first" and "second" may explicitly or implicitly include one or more such features. In the description of the present disclosure, "a plurality of" means two or more, for example two or three or the like, unless otherwise expressly and specifically defined.

In the present disclosure, the terms "mount", "couple", "connect", "fix", and the like should be understood broadly unless otherwise expressly specified or defined. For example, connection may be fixed connection or detachable connection or integral connection, may be mechanical connection or electric connection or mutual communication, or may be direct coupling or indirect coupling via an intermediate medium or internal communication between two elements or interaction between two elements. The specific meanings of the above-mentioned terms in the present disclosure can be understood by those of ordinary skill in the art according to specific situations.

In the present disclosure, unless otherwise expressly specified or defined, a first feature "on" or "below" a second feature may include a case where the first and second features are in direct contact, and may also include a case where the first and second features are not in direct contact, but are in contact via an additional feature therebetween. Moreover, a first feature "on", "above", or "over" a second feature is meant to include a case where the first feature is directly above or obliquely above the second feature, or merely means that the first feature is at a level height higher than the second feature. A first feature "below", "under", or "underneath" a second feature is meant to include a case where the first feature is directly below or obliquely below the second feature, or merely means that the first feature is at a level height lower than the second feature.

Finally, it should be noted that the above embodiments are merely intended to illustrate the technical solutions of the present disclosure, but not intended to limit the present disclosure. Although the present disclosure has been described in detail with reference to the foregoing embodiments, it should be understood by those of ordinary skill in the art that the technical solutions disclosed in the foregoing embodiments may still be modified, or some or all of the technical features thereof may be replaced with equivalents; and such modifications or replacements will not cause the essence of the corresponding technical solutions to depart from the scope of the technical solutions of the embodiments of the present disclosure.

INDUSTRIAL APPLICABILITY

The photoalignment device according to an embodiment of the present disclosure changes the shape of alignment dark patterns in pixel regions by changing the directions of the light rays emitted and the polarizing plates and changing the exposure regions and exposure directions in the substrates, whereby the area (or size) of the alignment dark patterns generated by the photoalignment is greatly reduced, the transmittance of the pixel regions can be effectively improved, and therefore the transmittance of the liquid crystal display panel can be effectively improved.

What is claimed is:

1. A photoalignment method, comprising:
adjusting a direction of a light ray emitted from a light source so that a first angle is formed between the light ray emitted and an XOY plane, and a second angle is formed between a projection line of the light ray on the XOY plane and a Y-axis;
adjusting an angle of a polarizing plate so that the polarizing plate is parallel to the XOY plane, and a light transmission axis of the polarizing plate is parallel to the projection line of the light ray on the XOY plane;
moving an array substrate along a negative direction of the Y-axis to perform an exposure operation on the array substrate, wherein a region of the array substrate corresponding to one pixel is provided with four exposure regions along the Y-axis, including a first region, a second region, a third region, and a fourth region wherein the first region and the second region have exposure directions opposite to each other, the second region and the third region have exposure directions perpendicular to each other, and the fourth region and the third region have exposure directions opposite to each other; and
moving a color filter substrate, which has been rotated by 180 degrees with respect to a working position corresponding to the array substrate on a plane of the color filter substrate, in the negative direction of the Y-axis to perform an exposure operation on the color filter substrate, wherein the color filter substrate has exposure regions which are completely identical, in position and number, to those of the array substrate, and each of the exposure regions of the color filter substrate, which has been rotated by 180 degrees, has an identical exposure direction to that of corresponding exposure region of the array substrate,
wherein after the color filter substrate, which has been rotated by 180 degrees with respect to a working position corresponding to the array substrate on a plane of the color filter substrate, is subjected to the exposure operation, the color filter substrate is rotated by 180 degrees again so that an exposure direction in each of the exposure regions of the color filter substrate is opposite to an exposure direction in corresponding exposure region of the array substrate;

the second angle ranges from 30° to 60°; and the first angle ranges from 30° to 50°.

2. The photoalignment method according to claim 1, wherein each of the exposure regions is correspondingly provided with one light source and the polarizing plate corresponding to the light source, wherein light rays emitted from light sources corresponding to the first region and the second region are projected on the XOY plane in opposite directions, light rays emitted from light sources corresponding to the second region and the third region are projected on the XOY plane in directions perpendicular to each other, and light rays emitted from light sources corresponding to the fourth region and the third region are projected on the XOY plane in opposite directions.

3. The photoalignment method according to claim 1, wherein numbers of light sources and polarizing plates are both four, the first angle is formed between a light ray emitted from each of the four light sources and the XOY plane, and light rays emitted from the four light sources are projected on the XOY plane in different directions to achieve different exposure directions in the four exposure regions.

4. The photoalignment method according to claim 1, wherein each of the exposure regions is correspondingly provided with one mask, wherein the mask comprises a light-transmitting zone and a light-shielding zone, and the light-transmitting zone corresponds to the position of a region where an exposure operation is to be performed.

5. The photoalignment method according to claim 4, wherein four masks are provided, corresponding to four exposures, respectively, wherein in an exposure of the first region, a position of an used mask corresponding to the first region is the light-transmitting zone, and a position of the used mask corresponding to each of the second region, the third region and the fourth region is the light-shielding zone.

6. The photoalignment method according to claim 4, wherein the mask is disposed between the polarizing plate and the array substrate.

7. The photoalignment method according to claim 1, wherein each of the exposure regions is correspondingly provided with one light source and the polarizing plate corresponding to the light source, wherein light rays emitted from light sources corresponding to the first region and the second region are projected on the XOY plane in opposite directions, light rays emitted from light sources corresponding to the second region and the third region are projected on the XOY plane in directions perpendicular to each other, and light rays emitted from light sources corresponding to the fourth region and the third region are projected on the XOY plane in opposite directions.

8. The photoalignment method according to claim 1, wherein numbers of light sources and polarizing plates are both four, the first angle is formed between a light ray emitted from each of the four light sources and the XOY plane, and light rays emitted from the four light sources are projected on the XOY plane in different directions to achieve different exposure directions in the four exposure regions.

9. The photoalignment method according to claim 2, wherein numbers of light sources and polarizing plates are both four, the first angle is formed between a light ray emitted from each of the four light sources and the XOY plane, and light rays emitted from the four light sources are projected on the XOY plane in different directions to achieve different exposure directions in the four exposure regions.

* * * * *